United States Patent [19]
Teich

[11] 3,875,399
[45] Apr. 1, 1975

[54] MULTI-FREQUENCY OPTIMUM HETERODYNE SYSTEM

[75] Inventor: Malvin Carl Teich, Woodmere, N.Y.

[73] Assignee: Research Corporation, New York, N.Y.

[22] Filed: Oct. 18, 1973

[21] Appl. No.: 407,603

Related U.S. Application Data

[63] Continuation of Ser. No. 69,718, Sept. 4, 1972.

[52] U.S. Cl. ............... 250/199, 325/17, 325/47, 328/133, 343/7.7, 336/28
[51] Int. Cl. ............................................. H04b 9/00
[58] Field of Search .............. 325/15, 17, 44, 47; 328/133, 141; 343/8, 9, 7 A, 7.7, 13 R, 12 R, 12 A; 250/199; 356/28

[56] References Cited
UNITED STATES PATENTS
3,409,369 11/1968 Bickel .................................. 356/28
3,542,472 11/1970 Vaniz .................................. 343/14

Primary Examiner—Robert L. Griffin
Assistant Examiner—Aristotelis M. Psitos
Attorney, Agent, or Firm—Yuter & Rosen

[57] ABSTRACT

A transmission system which transmits first and second frequency signals separated by a difference frequency to a moving target which reflects or scatters the Doppler-shifted signals as respective third and fourth signals which are separated in frequency substantially by the difference signal. The third and fourth signals are heterodyned in a receiver with a local oscillator, and the output of the heterodyne stage is connected to a filter which passes preselected ones of the heterodyned signals to a non-linear device. The non-linear device produces a signal in response to the preselected signals, the frequency of which is substantially equal to the difference frequency. The transmission may be directly to a receiver for communicating so that the Doppler shift occurs primarily because of relative movement between the transmitter and receiver. The receiver may also be used separately for detection of Doppler-shifted multiple signals radiated by remote or local excited species in order to detect and identify the excited species.

22 Claims, 2 Drawing Figures

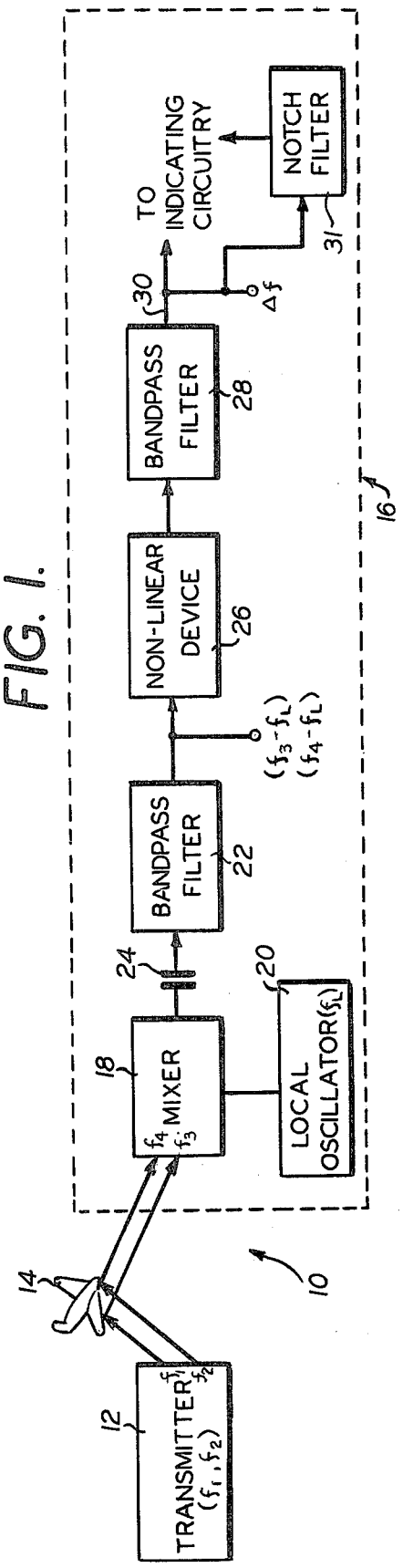
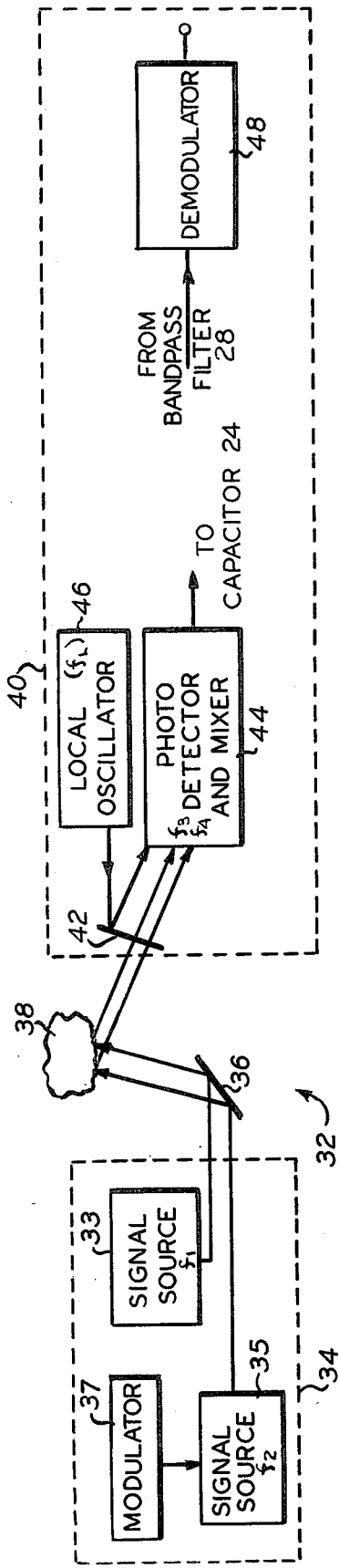

MULTI-FREQUENCY OPTIMUM HETERODYNE SYSTEM

This is a continuation of application Ser. No. 069718, filed Sept. 4, 1972.

This invention relates generally to a system which is ideally suited for use as an acquisition or a tracking radar or communication system, and to detect and identify a source of remotely or locally emitted weak signals.

It is a well known fact in radar technology that when a target to be detected or monitored is moving with respect to the radar receiver, the signal reflected or scattered from the target will be shifted in frequency due to the Doppler effect. Moreover, this so-called Doppler shift is related to velocity. Accordingly, when the velocity of the target is known the Doppler frequency shift can be easily calculated. Accordingly, the receiver may then be turned to the frequency shifted signal to increase the sensitivity of the system. However, a major problem is presented when the target velocity is unknown which, in turn, places a severe limitation on presently available acquisition and tracing radar systems.

To be more specific, when the velocity of the target is unknown, as is the case with most target detecting systems, the Doppler shift in frequency of the reflected signal cannot be calculated. In order to compensate for the unknown frequency shift, the receiver circuits are usually made broadband so that they can accommodate signals having frequencies which fall into a large band. However, increasing the bandwidth of the receiver circuits also increases the amount of noise signals which can pass through the receiver to the final output stages. Consequently, in practice it has been found that these noise signals may actually mask the information signals thereby causing the system to produce erroneous or null results. Hence, these systems are inherently subject to unreliable and inaccurate results.

Many solutions have been proposed to ameliorate the above problem but each solution has an inherent drawback. For example, one such solution is to use a narrow band receiver and heterodyne the received signal of unknown frequency with a local oscillator the frequency of which continuously varies. The theory behind this system is that at one point the received and local signals will mix to provide an intermediate signal which will pass through the receiver circuits. A similar system includes a relatively narrow bandpass filter in the receiver chain, the passband of which is varied. However, all of these systems are extremely inaccurate, particularly when they are utilized in acquisition radar schemes. Thus, since the system is scanning in both space and frequency tuning within the receiver, the signal indicating the target may be missed completely.

Accordingly, an object of the present invention is to provide an improved transmission system.

A more specific object of this aspect of the invention is to provide a transmission system which is specifically adapted for use as a radar acquisition or tracking system.

Another object of the invention is the provision of a transmission system which permits the continuous seeking and/or monitoring of a target regardless of Doppler shifts.

Another object of the invention is the provision of a transmission system which substantially eliminates the need for a stable local oscillator or the frequency scanning of the same or other circuit elements thereby reducing both the cost and the complexity of the associated circuitry.

A further disadvantage associated with presently known radar systems of the type described above arises even in those cases where the velocity of the target is known. To be more specific, as the radar system sweeps through an angle as it tracks a target the component of the velocity detected by the radar system continuously changes. Thus, the frequency shift of the reflected signal due to the Doppler effect likewise continuously varies and may fall out of the receiver passband. Such systems are designated angle dependent systems.

Accordingly, another object of the present invention is the provision of a transmission system which is angle independent even when utilized as a tracking radar system.

The Doppler effect occurs whenever one body is moving with respect to another. Thus, signals passing between a transmitter and a receiver will be shifted in frequency if either one or both elements of the system are in motion. Thus, in rocketship-to-rocketship communication systems, for example, the signals may be so shifted in frequency due to the velocities of the rocketships that the received signal may fall outside the passband of the receiver. The receiver may, of course, be tuned so that it will receive a wide band of frequencies; however, this solution produces problems similar to those described above with respect to widening the bandwidth of a radar receiver.

Accordingly, a further object of the invention is to provide a transmission system which insures the accurate retrieval of information from a transmitted signal regardless of movement of the transmitter and/or the receiver.

A more specific object of this aspect of the invention is to provide a high efficient and effective communication system which is operable to extract information modulated on a transmitted signal regardless of Doppler frequency shifts which occur in the system.

Accordingly, a transmission system constructed according to one aspect of the invention comprises transmission means for transmitting first and second frequency signals which are separated by a difference frequency whereby said first and second frequency signals may be received as respective third and fourth frequency signals which are separated substantially by the difference frequency. A receiver is provided which includes mixing means for mixing the third and fourth signals with a nonvaried fifth frequency signal to produce a plurality of mixed signals at least some of which are separated by the difference frequency. Filter means is connected to the mixing means for passing preselected ones of the plurality of mixed signals which are separated by the difference frequency. Detecting means is responsive to the preselected ones of the mixed signals for producing an output signal having a frequency related to the difference frequency. The nonvaried fifth frequency signal is preferably produced by a strong local oscillator.

In accordance with another aspect of the invention, the receiving system may be used separately for the improved passive emission detection of weak signals either emitted spontaneously (or stimulated by exposure to light, electrons, or other waves or particles) by an atom, molecule, collection of atoms, collection of molecules, liquid, gas, solid, or plasma. In this case, the two or more frequencies emitted and their difference frequency or frequencies may be unique to the source of radiation (which acts as the transmitter) enabling the final bandpass filter in the receiver to be tuned to a naturally-occurring difference frequency, providing near-optimum detectability for the species being detected. Examples of use in this mode include the determination of the existence and the measurement of distant (including atmospheric and extraterrestrial) species, including pollutants. Using the receiving system, detectability is unaffected by the Doppler shift caused by the gross and relative motion of these species. In the prior system, the unknown Doppler shifts due to both the gross and relative motion of such species (e.g. galactic nebulae or smokestack effluent) generally reduced the detectability enormously.

Other features and advantages of the present invention will become more apparent from a consideration of the following detailed description when taken in conjunction with the accompanying drawing, in which:

FIG. 1 is a schematic circuit diagram, in block form, of a transmission system constructed according to the present invention and whose receiving portion may be used separately for passive emission detection; and FIG. 2 is a schematic circuit diagram, in block form, of a modified embodiment of a transmission system constructed according to the present invention wherein modulated information may be transmitted from a transmitter to a receiver.

In one sense, the system of the present invention is operable to transmit two signals which are separated by a difference frequency to a target. The two signals which are reflected or scattered from the target and which may be shifted in frequency due to Doppler effects are received by a receiving apparatus which is operable to extract a signal having the difference frequency, or substantially the difference frequency depending on the velocity of the target, from the received signals. Hence, the presence of this extracted signal indicates that the target is, in fact, present and may be continuously monitored.

In another sense the receiving system may be used separately for passive emission detection.

More specifically, a transmission system constructed according to the present invention is designated generally by the reference numeral 10 in FIG. 1 and includes a transmitter 12. The transmitter 12 is a so-called two-frequency transmitter and transmits two signals at frequencies $f_1$ and $f_2$. (For ease of reference, these signals will be referred to as signals $f_1$ and $f_2$ and the reflected signals, which are frequencies $f_3$ and $f_4$, will similarly be referred to as signals $f_3$ and $f_4$.) The transmitted signals $f_1$ and $f_2$ are separated by a difference frequency $\Delta f$. The signals $f_1$ and $f_2$ may be optical, infrared, or microwave frequency signals and the only design limitation on the transmitter 12 is that the difference frequency $\Delta f$ remains substantially constant albeit the actual frequency of the signals may drift somewhat. This limitation is easily achieved if the transmitter is a two-mode laser since the modes tend to drift together thereby keeping the difference frequency $\Delta f$ constant. A practical laser which has these properties is a carbon dioxide laser. However, this example is not to be considered as being a limitation of the present invention since any type of transmitter which maintains the difference frequency substantially constant may be utilized.

As noted above, the signals $f_1$ and $f_2$ are transmitted to a target 14. Under normal circumstances, the target 14 which may, for example, be a satellite, an airplane, an astronomical body, or the like is moving and the signals impinging on the target 14 and being reflected or scattered therefrom will be shifted in frequency due to Doppler effects. In addition to frequency shifts due to the velocity of the target, it should be noted that the signals may also be broadened in frequency due to the scattering of the signals. Accordingly, after reflection or scattering, the signal $f_1$ will have a frequency $f_3$ and the signal $f_2$ after reflection or scattering will have the frequency $f_4$. However, as noted in greater detail below, the difference in frequency between the signals $f_3$ and $f_4$ will be substantially equal to the difference frequency $\Delta f$.

The signals $f_3$ and $f_4$ are received by a receiving apparatus designated generally by the reference numeral 16. The receiving apparatus or receiver 16 includes a mixer or mixing stage 18 to which the signals $f_3$ and $f_4$ are applied. It is to be understood that the stage 18 may include a photodetector or other detector of electromagnetic radiation as well as amplifiers for amplifying the received signals. A local oscillator 20 applies a signal $f_L$ to the mixer 18. The mixer 18 is operable to mix three signals together. That is, the mixer 18 is operable to mix the signal $f_L$ from the local oscillator 20 with the received signals $f_3$ and $f_4$ to produce a plurality of signals which may include sum and difference frequency signals as well as intermodulation signals.

In practice, where a carbon dioxide or other infrared or optical laser is used as the source of the signals, the mixer will usually produce only difference frequency components and a dc component and not sum frequency and double-frequency components. Additionally, it is desirable to provide a relatively strong local oscillator signal $f_L$ so that the signal-to-noise ratio is maximized, in which case the signal of frequency $f_3-f_4$ will be relatively weak. However, these examples are for illustrative purposes only and are not to be interpreted as being a limitation on the present invention.

The output terminals of the mixer 18 are connected to a bandpass filter 22 through a blocking or coupling capacitor 24 which blocks the DC component of the mixed signals produced by the mixer 18.

The passband of the filter 22 is chosen so that only the difference frequencies in the band of frequencies under consideration will appear at the output terminals thereof. That is, the passband of filter 22 is selected to be narrow to reduce the amount of noise which may pass through the filter. However, the filter, although limiting noise, still is of sufficient width to pass the difference signals produced by the mixer 18. Hence, in the example under consideration, the signals appearing at the output terminals of the bandpass filter will comprise a signal having the frequency $(f_3 - f_L)$ and a signal having the frequency $(f_4 - f_L)$. Since the signals $f_3$ and $f_4$ were substantially separated by the difference frequency $\Delta f$, it is obvious that the signals $(f_3 - f_L)$ and $(f_4 - f_L)$ will similarly be substantially separated by the difference frequency $\Delta f$.

The signals appearing at the output terminals of the bandpass filter 22 are applied to a non-linear device 26. The non-linear device 26 is operable to produce a signal having a component at the difference frequency $\Delta f$. That is, the cross product of the input signals $(f_3 - f_L)$ and $(f_4 - f_L)$ will produce a signal at the output whose peak is centered at substantially the frequency $\Delta f$. One such non-linear device may be a square-law device. However, it is emphasized that this is by way of illustration only and is not to be interpreted as being a limitation on the present invention. That is, similar results would be expected with any linear device such as a non-linear linear device in place of the square-law device.

The output terminals of the non-linear device 26 are connected to a bandpass filter 28 which has a relatively narrow passband centered near or about the difference frequency $\Delta f$. Accordingly, the signal appearing on a lead 30 which is connected to the output terminals of the filter 28 will have a frequency very close or equal to $\Delta f$. This signal may then be applied to appropriate indicating or processing circuitry to indicate the presence of the detected signal.

Summarizing the operation of the above system, the transmitted signals which are substantially separated by a difference frequency $\Delta f$ are received by the receiver 16 and are heterodyned by a mixer 18 in conjunction with a local oscillator 20 to produce difference signals. These difference signals are applied to a non-linear device which produces a signal at substantially the frequency $\Delta f$. The signals are applied to a bandpass filter which passes the signal having substantially the frequency $\Delta f$ and applies the same to appropriate indicating circuitry. Accordingly, a system has been described which permits facilitated acquisition and continuous monitoring of a target and which eliminates the need for high-frequency electronics and their attendant disadvantages, in view of the fact that a low-frequency signal very close to $\Delta f$ is processed by indicating circuitry and the like rather than higher frequency signals. This system provides an ease in impedance matching as well as a high signal-to-noise ratio and a low minimum-detectable-power.

Alternatively, the receiving apparatus 16 may be used separately for passive emission detection.

Another advantage of the present system is that the bandwidth of the system can be extended over a greater range than conventional radar systems. That is, the final indicating circuit is still tuned to substantially the frequency $\Delta f$ even though the bandwidth of the bandpass filter 22 may be increased. Additionally, the present system eliminates the need for the electronic tuning of frequency sensitive circuits and their attendant cost and complexity.

As noted above, it has been assumed that the frequency difference between signals $f_3$ and $f_4$ is substantially equal to the frequency difference $\Delta f$ between signals $f_1$ and $f_2$. To put this another way, it has been assumed that the frequency difference $\Delta f$ after undergoing a Doppler shift (i.e., the difference between signals $f_3$ and $f_4$) is substantially equal to the difference $\Delta f$ before such Doppler shift (i.e., the difference between signals $f_1$ and $f_2$). To put this still another way, it has been assumed that the difference between the Doppler shifted difference signal and the difference signal before Doppler shift is zero. Thus, consider an example utilizing a carbon dioxide laser radar operating at 10.6 mm in the infrared region. Assuming that a difference frequency $\Delta f$ is chosen with a value of 1 MHz and that the target is a satellite having a 1 meter radius with a rotation rate of 1 rpm, and a radial velocity of approximately 10 km/sec; then, the Doppler frequency will be equal to approximately 2 GHz. Utilizing these quantities, calculations show that the difference between the Doppler shifted difference frequencies $f_3$ and $f_4$ and the difference $\Delta f$ between the transmitted signals $f_1$ and $f_2$ is approximately equal to 60 Hz. This is a very small shift and justifies the assumption that the difference frequency between signals $f_3$ and $f_4$ is substantially equal to the difference frequency between signals $f_1$ and $f_2$. (For more detailed analysis of this calculation, the reader is referred to the article: Three-Frequency Heterodyne System for Acquisition and Tracking of Radar and Communications Signals, by the inventor, which appears in Volume 15, Number 12 of the *Applied Physics Letters* of Dec. 15, 1969, pages 420–423, hereby incorporated by reference.)

The transmission system of FIG. 1 may also be utilized to eliminate clutter from the received signal. That is, where it is desired to seek or track a moving target, stationary objects may produce signals or "clutter" which may mask the desired signals. Accordingly, in order to eliminate such clutter a notch filter 31 is provided which is connected to the output terminals of the bandpass filter 28. The output terminals of the filter 31 are connected to the appropriate indicating circuitry. The notch filter is tuned precisely to the known difference frequency $\Delta f$ and has an extremely sharp characteristic so that only signals at the frequency $\Delta f$ will be attenuated by the filter.

In operation, if the radar signal is reflected or scattered from a stationary object it will not undergo any Doppler shift and, accordingly, the filter 28 output signal will be exactly equal to $\Delta f$. However, this signal will be attenuated by the filter 31. On the other hand, if the signal is reflected or scattered from a moving target, the signal appearing at the output terminals of the bandpass filter 28 will be nearly but not exactly equal in frequency to $\Delta f$. Thus, this latter signal will pass through the notch filter 31 to indicate the moving target.

Accordingly, the transmission system of the present invention accurately indicates a moving target in the presence of stationary objects.

In conventional communication systems wherein information modulated on a signal is transmitted to a receiver, the transmitted signal may be Doppler shifted in frequency due to the movement of either the transmitter, the receiver, or both. Additionally, the signal may be shifted in frequency due to reflection or scattering of the signal from a moving target. Thus, if the shifted frequency signal falls outside the passband of the receiver, the information will be lost. Accordingly, FIG. 2 illustrates a transmission system constructed according to the present invention which may be utilized as a communications system to transmit information from a transmitter to a receiver in the presence of Doppler shifts.

While the embodiment of FIG. 2 illustrates the more complex case wherein the Doppler shift is produced by reflecting or scattering the signal from a moving target as well as from motion of the transmitter and/or receiver, it is to be noted that this is for illustrative purposes only. That is, in the simpler case the transmitter transmits directly to the receiver and the Doppler shift occurs only because of relative movement therebetween.

More specifically, the communications system of FIG. 2 is designated generally by the reference numeral 32 and includes transmitting apparatus 34. The apparatus 34 is adapted to transmit signals having frequencies $f_1$ and $f_2$ which are separated by a difference frequency $\Delta f$. The transmitting apparatus may include a two-frequency laser of the type noted above or, alternatively, two single-frequency lasers. Additionally, one of the frequency signals produced by the transmitting apparatus 34 may be modulated in accordance with known modulating techniques so that, for example, the signal $f_2$ will carry information modulated thereon.

Thus, as shown in FIG. 2, a source 33 of signals $f_1$ is provided. Additionally, a source 35 of signals $f_2$ is provided which is modulated by a modulator 37. That is, only one of the transmitted signals is modulated.

The signals $f_1$ and $f_2$ may be reflected from a mirror 36 to a moving target 38. Of course, if transmission is directly to the receiver the mirror 36 may be eliminated. The signal reflected or scattered from the moving target 38 will be shifted in frequency due to Doppler shift and, accordingly, the signal $f_1$ will be returned as signal $f_3$, and the modulated signal $f_2$ will be returned as signal $f_4$. In other words, the signal of frequency $f_3$ will be the transmitted signal $f_1$ but shifted in frequency due to the Doppler shift and the signal of frequency $f_4$ will be the signal $f_2$ also shifted in frequency due to Doppler effect. The returned signals $f_3$ and $f_4$ are received by a receiver designated generally by the reference numeral 40.

The receiver 40 includes a beamsplitter 42 through which the signals $f_3$ and $f_4$ pass to the photodetector and mixer 44. Associated with the mixer 44 is a local oscillator 46 which may comprise a single-frequency laser which produces a beam at a frequency $f_L$. The output signal of the oscillator 46 is reflected from the beamsplitter 42 to the photodetector and mixer 44. The photodetector and mixer 44, similarly to the mixer 18, is operable to produce the sum, double, and difference frequency signals between $f_3$, $f_4$ and $f_L$ and intermodulation signals. The remainder of the receiving chain in the receiver 40 is similar to the chain in the receiver 16. That is, connected to the mixer 44 is a series circuit comprising the capacitor 24, bandpass filter 22, non-linear device 26 and a bandpass filter 28 which is centered at the difference frequency $\Delta f$. The output signal from the bandpass filter 28 is applied to a demodulator 48 which demodulates the information carried by the signal of center frequency substantially equal to $\Delta f$ so that the information impressed on the original waveform may be retrieved.

The operation of the system of FIG. 2 is similar to the operation of the system of FIG. 1 described above, with the exception that the signal $f_2$ is modulated, as noted above. The non-linear device 26 in the apparatus of FIG. 2 produces a component centered substantially at the frequency $\Delta f$. This frequency signal is applied through the bandpass filter 28 to the demodulator 48. By modulating only one of the original signals $f_2$, the signal by signal component reaching the demodulator 48 through the bandpass filter 28 results from the convolution of a delta-function (at frequency $f_1$) with the modulated signal (centered at $f_2$), and is simply the original modulated information.

Accordingly, the above described communications system is operable to directly retrieve information from a modulated signal regardless of frequency shifts due to Doppler effects.

It is also to be noted that the systems of FIG. 1 and FIG. 2 also produce accurate results in the presence of scattering or atmospheric effects which, in effect, produce a frequency broadening of each transmitted signal. Moreover, the receiving portion of the system of FIG. 1 may be used separately for passive emission detection.

While preferred embodiments of the invention have been shown and disclosed herein, it will be obvious that numerous omissions, changes and additions may be made in such embodiments without departing from the spirit and scope of the present invention.

What is claimed is:

1. A transmission system comprising transmission means for transmitting first and second frequency signals separated by a difference frequency to a moving target whereby said first and second frequency signals may be received as respective third and fourth frequency signals which differ in frequency from said first and second frequency signals because of the Doppler effect but which are separated by substantially said difference frequency, and receiving means for receiving said third and fourth frequency signals, said receiving means comprising local signal generation means for generating a local signal at a nonvaried fifth frequency, mixing means for mixing said third and fourth frequency signals with said fifth frequency signal to produce a plurality of mixed signals including signals which are separated by substantially said difference frequency, filter means connected to said mixing means for passing preselected ones of said plurality of mixed signals which are separated by substantially said difference frequency, and detecting means responsive to said preselected ones of said mixed signals for producing an output signal having a frequency related to said difference frequency.

2. A transmission system as in claim 1, in which said transmission means is a two-mode laser.

3. A transmission system as in claim 2, in which said laser is a carbon dioxide laser operating at said first and second frequencies.

4. A transmission system comprising transmission means for transmitting first and second frequency signals separated by a difference frequency to a moving target whereby saiad first and second frequency signals may be received as respective third and fourth frequency signals which differ in frequency from said first and second frequency signals becuse of the Doppler effect but which are separated by substantially said difference frequency, and receiving means for receiving said third and fourth frequency signals, said receiving means comprising local signal generation means for generating a local signal at a fifth frequency, which local signal is substantially stronger than said received third and fourth frequency signals, mixing means for mixing said third and fourth frequency signals with said substantially stronger fifth frequency signal to produce a plurality of mixed signals including signals which are separated by substantially said difference frequency and are substantially stronger than signals produced by mixing together said third and fourth frequency signals, filter means connected to said mixing means for passing preselected ones of said plurality of mixed signals which are separated by substantially said difference frequency, and detecting means principally responsive to the substantially stronger of said preselected ones of said mixed signals for producing an output signal having a frequency related to said difference frequency.

5. A transmission system as in claim 4, in which said filter means comprises a bandpass filter having a passband which encompasses signals having frequencies equal to said fourth frequency minus said fifth frequency and said third frequency minus said fifth frequency.

6. A transmission system as in claim 5, in which said detecting means comprises a non-linear device response to said preselected ones of said mixed signals for producing a signal having a frequency substantially equal to said difference frequency, and a filter connected to said non-linear device for passing said signal having a frequency substantially equal to said difference frequency.

7. A transmission system as in claim 6, in which said non-linear device comprises a square-law device.

8. A transmission system as in claim 1, in which said transmission means includes a modulator for modulating said first frequency signal with preselected information, and said detecting means comprises a non-linear device responsive to said preselected ones of said mixed signals for producing a signal having a frequency substantially equal to said difference frequency, and having said information modulated thereon, a filter connected to said non-linear device having a passband which encompasses said signal produced by said non-linear device, and a demodulator connected to said filter for demodulating the signal passed by said filter.

9. A transmission system as in claim 1, and filter means connected to said detecting means for attenuating those signals having a frequency precisely equal to the difference in frequency between said first and second frequency signals.

10. A transmission system as in claim 9, in which said filter means comprises a notch filter.

11. A transmission system comprising a transmitter for transmitting first and second frequency signals separated by a first difference frequency to a moving target and a receiver for receiving third and fourth signals respectively related to said first and second signals and separated by a second difference frequency, said receiver comprising heterodyne means for mixing a fifth frequency signal with said signals to produce a plurality of mixed signals, a first filter for passing preselected ones of said plurality of mixed signals which are separated by said first and second difference frequencies, a non-linear device responsive to said preselected ones of said signals for producing an indication signal having a frequency exactly equal to said second difference frequency, and a second filter for attenuating a signal having a frequency exactly equal to said first difference frequency and for passing only said indication signal.

12. A transmission system as in claim 11, in which said non-linear device is a square-law device.

13. A transmission system as in claim 11, in which said transmitter is a two-mode laser.

14. A transmission system as in claim 6, in which said transmission means comprises a modulator for modulating at least said first frequency signal with preselected information, and said receiving means comprises a demodulator connected to said second filter for demodulating the signal passed thereby.

15. A transmission system comprising transmission means for transmitting first and second frequency signals separated by a first difference frequency to a moving to a moving target whereby said first and second frequency signals may be received as respective third and fourth frequency signals which are separated by a second difference frequency which is slightly different from said first difference frequency, and receiving means for receiving said signals, said receiving means comprising means for detecting a signal only having a frequency exactly equal to said second difference frequency.

16. A signal detection system for detecting a signal source which produces first and second frequency signals separated by a first difference frequency which are received at a signal receiving position as respective third and fourth frequency signals which differ in frequency from said first and second frequency signals because of Doppler effect caused by relative motion between the signal source and signal detecting position and which are separated by a second difference frequency substantially equal to said first difference frequency, said signal detection system comprising receiving means at said signal receiving position for receiving said third and fourth frequency signals, local signal generation means for generating a local signal at a nonvaried fifth frequency, mixing means for mixing said third and fourth frequency signals with said fifth frequency signal to produce a plurality of mixed signals including mixed signals which are separated by substantially said second difference frequency, non-linear means responsive to said mixing means for producing signals including a signal having a frequency equal to said second difference frequency, filter means, responsive to said non-linear means, having a bandpass including said second difference frequency for passing a signal having a frequency equal to said second difference frequency, and indicating means responsive to said filter means for producing an output signal indicating the detection of said signal source.

17. A signal detection system for detecting remote or local multiple-signal radiating matter at a signal detection position when there is relative motion between the multiple-signal radiating matter and the signal detection position, said multiple-signal radiating matter radiating at least two signals having first and second frequencies together with a first difference frequency signal having a frequency equal to the difference between such first and second frequencies, said signal detection system comprising:
  A. receiving means for receiving third and fourth frequency signals which differ in frequency from said first and second frequency signals because of the Doppler effect which are separated by a second difference frequency which is substantially equal to said first difference frequency;
  B. local signal generation means for generating a local signal at a nonvaried fifth frequency;
  C. mixing means for mixing said third and fourth frequency signals with said fifth frequency signal to produce a plurality of mixed signals including mixed signals which are separated by substantially said second difference frequency;
  D. non-linear means responsive to said mixing means for producing signals including an output signal having a frequency equal to said second difference frequency;
  E. filter means connected to said non-linear means for passing only the signals having a frequency substantially equal to said second difference frequency; and F. indicating means responsive to said filter means for producing an output signal indicating the detection of said multiple-signal radiating matter.

18. The signal detection system of claim 17 wherein said local signal generation means generates a non-varied fifth frequency signal which is substantially stronger than said received third and fourth frequency signals.

19. The signal detection system of claim 18 wherein said mixing means produces a plurality of mixed signals including signals which are separated by substantially said difference frequency and are substantially stronger than signals produced by mixing said third and fourth frequency signals.

20. The signal detection system of claim 17 including further filter means connected between said mixing means and said non-linear means having a passband which encompasses signals having frequencies equal to said fourth frequency minus said fifth frequency and said third frequency minus said fifth frequency.

21. The signal detection system of claim 19 further comprising an attenuating means responsive to said filter means for attenuating signals having a frequency precisely equal to said first difference frequency.

22. The signal detection system of claim 21 wherein said attenuating means comprises a notch filter.

* * * * *